May 4, 1943.  W. R. LANDY  2,317,996
LATHE TOOL GRINDING FIXTURE
Filed Aug. 27, 1941
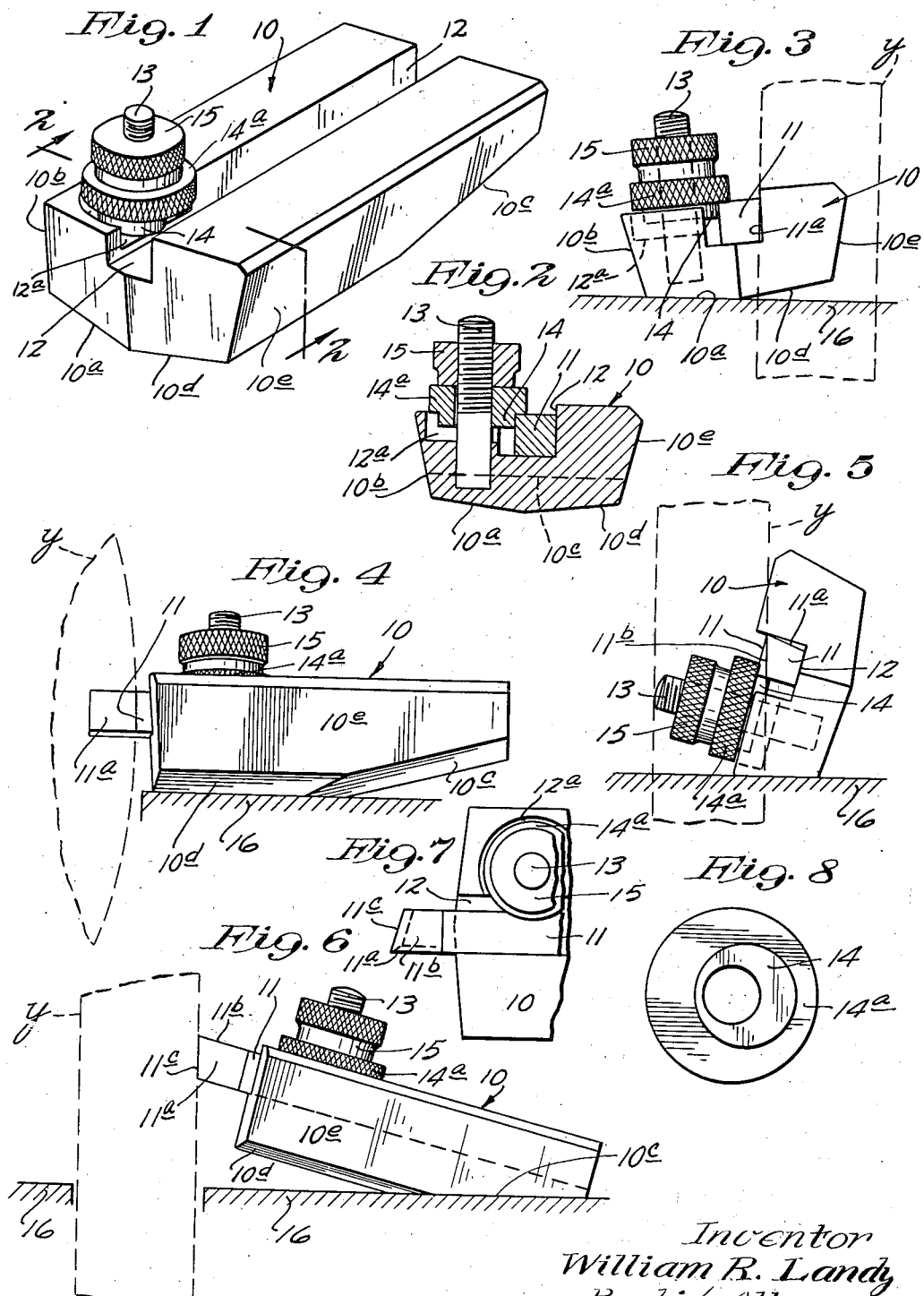
Inventor
William R. Landy
By his Attorneys Patented May 4, 1943

2,317,996

UNITED STATES PATENT OFFICE 2,317,996

LATHE TOOL GRINDING FIXTURE

William R. Landy, Minneapolis, Minn.

Application August 27, 1941, Serial No. 408,461

6 Claims. (Cl. 51—218)

My present invention provides a simple and highly efficient device for holding a cutting tool such as used in lathes, planers, shapers, and the like, and to accurately position the same with respect to the grinding wheel and the various angles on which the cutting end of the tool should be ground.

Generally stated, the invention consists of the novel devices, combinations of devices, and arrangement of parts hereinafter described and defined in the claims.

The main element of the fixture or device is in the nature of a metallic block provided with means for securely clamping the cutting tool thereon, and formed with various beveled surfaces which, when pressed on a flat supporting table or the like, determines the various angles on which the tool should be ground.

A commercial form of the device in a preferred embodiment is illustrated in the accompanying drawing wherein like characters indicate like parts throughout the several views.

Referring to the drawing:

Fig. 1 is a view in perspective showing the fixture or grinding device with the cutting tool removed therefrom;

Fig. 2 is a section taken on the line 2—2 of Fig. 1 but showing the cutting tool clamped in position on the block;

Fig. 3 is a front elevation of the fixture shown in Fig. 1 with the cutting tool clamped therein as shown in Fig. 2;

Fig. 4 is a side elevation of the device with the cutting tool applied to the block, as shown in Figs. 2 and 3, and indicating also by dotted lines a grinding wheel;

Fig. 5 is a view corresponding to Fig. 3 but illustrating a different adjustment of the fixture;

Fig. 6 is a side elevation of the device in another position for grinding;

Fig. 7 is a plan view of the device shown in Fig. 6 with some parts broken away; and Fig. 8 is a plan view of the eccentric element of the clamping device removed from working position and turned upside down in respect to the other views.

In Figs. 3, 4, 5 and 6 a grinding wheel y is indicated by dotted lines. The metallic block or body of the fixture is indicated as an entirety by the numeral 10; and the lathe tool is indicated by the numeral 11. This block 10 is preferably formed with a flat top surface that is cut through by a longitudinal groove 12. At one side the groove 12 has an offset pocket 12a. The numeral 13 indicates a threaded stud, the lower end of which is anchored in the block and projects upward through the pocket 12a. Loosely mounted on the stud 13 is a clamping eccentric 14 shown as formed with a projecting knurled rim 14a. Working with threaded engagement on the threaded end of the stud 13 is a clamping nut 15.

The cutting tool 11, when placed in the groove 12, as best shown in Fig. 2, will be tightly clamped against one side of said groove by rotation of the eccentric 14; and when the nut 15 is then tightened, the flange 14a will press the tool 11 tightly downward against the bottom of said groove. In this way cutting tools of varying cross-section, within certain limits, may be tightly clamped in the block.

In Figs. 3, 4, 5 and 6 a horizontal supporting table 16 is shown as located adjacent to the grinding wheel y. In describing the angles of the surfaces of the block 10, the top of the said block is treated as a horizontal plane. The bottom of the block is formed with bearing surfaces 10a and 10d which, from the medial longitudinal line of the block, converge slightly in respect to the horizontal or flat top of the block, the said angles of divergence being decidedly acute and, as shown, being approximately 10°. At its sides the block 10 is formed with bearing surfaces 10b and 10e that are acute angles to perpendiculars projected from the flat top of the block, the said angles, as shown in this particular instance, being approximately 14° with respect to said perpendiculars. In longitudinal sections the beveled surfaces 10a, 10d, 10b and 10e are parallel to the medial axis of the block.

For a further important purpose the rear or tail portion of the block 10, at its under surface, is provided with a flat beveled surface 10c. This surface 10c in cross-section is parallel to the upper surface of the block. Also, as shown, the flat bearing surface 10c is approximately 15° to the top of the block. However, the said angles above definitely given are not limiting and may be varied according to the bevel which is desired to be given to the surface of the cutting tool.

The fixture or grinding device described may be very advantageously used as follows: First, place the device, as shown in Figs. 3 and 4, with its flat bottom surface 10a on the supporting table and move the two against the side of the grinding wheel, thereby producing on the end of the tool 11 the beveled clearance surface 11a.

Next, turn the block with its beveled flat edge 10b on the supporting table and move the tool against the side of the grind stone, as shown in Fig. 5, thereby grinding on the upper surface of the projecting end of the tool 11 the inclined surface 11b.

Then, to bevel the extended cutting end of the tool 11 place the block on its flat beveled bottom surface 10c and project the tool against the stone, as shown in Fig. 6, thereby cutting the inclined end surface 11c. In grinding this surface 11c the block should be turned at a proper angle to the face of the grinding wheel so as to bevel the said surface 11c, not only as shown in Fig. 6, but also as shown in Fig. 7.

A cutting tool ground as just described would be adapted to cut by a movement from left to right or downward in respect to Fig. 7, and a tool thus ground would be called a right-hand cutting tool. The operation for grinding a tool for cutting in the opposite direction, to wit: by movement from right toward the left would be performed by an operation such as above described, except that instead of placing the block on its surface 10a it would be placed on its surface 10d in the first instance, and in the second instance, would be placed on its beveled side or edge surface 10e instead of being placed on its surface 10b as previously described.

A preferred form of the device has been described, but it will be understood that alterations in the details of construction and arrangement of the parts may be made within the spirit of the invention herein disclosed and claimed. As is evident, if the device were to be used only for grinding cutting tools for right-hand cutting, the surfaces 10d and 10e could be omitted, or conversely, for grinding only tools for left-hand cutting, the surfaces 10a and 10b could be omitted.

In the above described device the fixture or device for holding a cutting tool for grinding is the bottom of the groove 12 that constitutes the longitudinally extended tool-holding surface and this surface 12 is in the plane parallel to the top of the block.

What I claim is:

1. A grinding fixture of the kind described in the form of a block provided with a longitudinally extended tool-holding surface, said block having a bottom supporting surface which, in transverse section, is at an acute angle to said tool-holding surface, and in longitudinal section, is parallel to said tool-holding surface, said block, at its rear portion, having a tail end supporting surface which, in longitudinal section, is at an acute angle to said tool-holding surface and, in transverse section, is parallel to said tool-holding surface, said block having means for clamping the cutting tool against said tool-holding surface.

2. The structure defined in claim 1 in which said block, at one side of said tool-holding surface, has a bearing surface that, in longitudinal section, is parallel to said tool-holding surface and, in transverse section, is at an obtuse angle to said bottom bearing surface.

3. A grinding fixture of the kind described in the form of a block provided with a longitudinally extended tool-holding surface, said block having bottom supporting surfaces which, in transverse section, are at the same acute angle to said tool-holding surface and, in longitudinal section, are parallel to said tool-holding surface; said block, at its rear, having a tail end supporting surface which, in longitudinal section, is at an acute angle to said tool-holding surface and, in transverse section, is parallel to the plane of said tool-holding surface, said block having means for clamping the cutting tool against said tool-holding surface.

4. The structure defined in claim 3 in which said block, at its sides, has bearing surfaces that, in longitudinal section, are parallel to said tool-holding surface and, in transverse section, are at a common oblique angle to said bottom bearing surfaces.

5. The structure defined in claim 1 in which said tool-holding surface is formed by a groove extended longitudinally of the top of said fixture, and in further combination with means applied to the top of said fixture for clamping a tool in said groove.

6. The structure defined in claim 3 in which said tool-holding surface is formed by a groove extended longitudinally of the top of said fixture, and in further combination with means applied to the top of said fixture for clamping a tool in said groove.

WILLIAM R. LANDY.